United States Patent
Pryne et al.

[11] Patent Number: 5,874,373
[45] Date of Patent: Feb. 23, 1999

[54] ENHANCED ELECTRET NEEDLED FILTRATION MEDIA AND COMPOSITES

[75] Inventors: Scott H. Pryne; Ross D. West, both of Newburgh, N.Y.

[73] Assignee: American Felt & Filter Company, Newburgh, N.Y.

[21] Appl. No.: 818,601

[22] Filed: Mar. 14, 1997

[51] Int. Cl.$^6$ ............................................ B32B 5/06
[52] U.S. Cl. ..................... 442/388; 428/218; 428/219; 442/341; 442/345; 442/351; 28/107
[58] Field of Search ...................... 442/388, 341, 442/345, 351; 428/218, 219; 28/107

[56] References Cited

U.S. PATENT DOCUMENTS

| | | |
|---|---|---|
| Re. 35,236 | 5/1996 | Nolan, Jr. . |
| 2,724,457 | 11/1955 | Besser . |
| 2,916,038 | 12/1959 | Wade . |
| 4,215,682 | 8/1980 | Kubik et al. ............ 128/205.29 |
| 4,257,791 | 3/1981 | Wald . |
| 4,323,374 | 4/1982 | Shinagawa et al. ............ 55/132 |
| 4,376,642 | 3/1983 | Verity ............................ 55/105 |
| 4,478,620 | 10/1984 | Tamura . |
| 4,589,894 | 5/1986 | Gin et al. . |
| 4,626,263 | 12/1986 | Inoue et al. ................... 55/155 |
| 4,798,850 | 1/1989 | Brown . |
| 4,824,451 | 4/1989 | Vogt et al. .................... 55/528 |
| 4,880,448 | 11/1989 | Scherrer . |
| 4,886,527 | 12/1989 | Fottinger et al. ............. 55/156 |
| 4,902,449 | 2/1990 | Hobbs ............................ 261/94 |
| 4,917,714 | 4/1990 | Kinsley, Jr. ................... 55/524 |
| 4,917,942 | 4/1990 | Winters . |
| 4,983,192 | 1/1991 | Von Blucher et al. ........ 55/387 |
| 5,112,577 | 5/1992 | Tani et al. . |
| 5,130,134 | 7/1992 | Noddin et al. ............... 428/287 |
| 5,540,756 | 7/1996 | Hoppitt et al. ................. 95/69 |

FOREIGN PATENT DOCUMENTS

| | | |
|---|---|---|
| 683926 | 4/1930 | France . |
| 2048110 | 12/1980 | United Kingdom ........... B01D 50/00 |
| 2190689 | 11/1987 | United Kingdom ............. D04H 1/42 |

*Primary Examiner*—Christopher Raimund
*Attorney, Agent, or Firm*—Hayes, Soloway Hennessey, Grossman & Hage, P.C.

[57] ABSTRACT

An enhanced filtering media composite formed of a first electret media layer attached uniformly onto a second non-woven fibrous media layer by a special needling construction and procedure, so as to provide a needled media composite having increased mechanical strength and particle retention capacity. The first media electret layer is composed of about 50 wt. % mixture of polypropylene and modacrylic fibers, and the second media layer is composed of 80% 3 denier×3 inch polyester staple and 1.4 denier×1.5 inch polyester staple fibers, the fibers of one layer being selectively needled into the other layer using controlled needling density penetration, depth and repetitions to provide a composite having improved mechanical strength and filtration performance.

16 Claims, 5 Drawing Sheets

ENHANCED ELECTRET NEEDLED FILTRATION MEDIA AND COMPOSITES

BACKGROUND OF INVENTION

This invention pertains to filtration media composites, and pertains particularly to gas filtration media composites formed of a electret media layer attached uniformly to a second media layer by controlled needling so as to provide media composites having enhanced performance for gas filtration systems.

Layered filtration media for removing fine solid particulate matter from gases in which it is suspended are generally known, and may include either a layer of blended electrostatic fibers on an electret layer material and a conventional non-woven fibrous layer. For example, U.S. Pat. No. 2,724,457 to Besser discloses an electrostatic air filter utilizing loosely woven electrostatic synthetic plastic yams so woven as to form irregular projections and pockets which disturb air flow to cause precipitation of dust particles in the filter. U.S. Pat. No. 2,916,038 to Wade discloses a tobacco smoke filter formed either of organic fiber electrets or a mixture of such electret fibers with non-electret fibers, such as natural or synthetic fibers of non-uniform diameter. The fibers may be rolled together and also twisted to form a cylindrical-shaped mass which can be bonded together by use of a binder or by heat.

U.S. Pat. No. 4,257,791 to Wald discloses a filtering medium formed of non-woven needled textile material having a bulk density gradient such that the front or facing portion has a greater bulk density than the rear portion of the filter U.S. Pat. No. 4,798,850 to Brown, discloses a blended fibrous filter material in which two types of fibers each carrying opposite electric charges are needled together so as to attract and retain dust particles and provide high filtration efficiency.

U.S. Pat. No. 4,880,448 to Scherrer discloses a double layer filter insert for an air cleaning apparatus, including a first pre-filter of polyester fibers as an upper or outer layer facing the inflow of dust laden air, and a second layer of an electrostatic nonwoven fabric loosely disposed behind as a lower or inner layer. The two layers are wedded together along their longitudinal edges. U.S. Pat. No. 4,917,942 to Winters discloses a fibrous filtration laminate including a self-supporting non-woven fabric and an intertangled non-woven mat of electret containing microfibers deposited on and adhering to the first layer.

U.S. Pat. No. 5,112,677 to Tani et al discloses an electret sheet construction including a porous sheet made of a dielectric polymer and at least one solid material selected from organic, inorganic materials, and metallic materials, and includes material spaced at various intervals on the surface of the dielectric polymer. Also, U.S. Pat. No. Re. 35,236 to Nolan discloses an air filter construction employing layers of woven media within a frame, increasing two layers of electrostatic polypropylene woven fabric in an "egg-crate" pattern, each separated by a centrally disposed polyester pad, and held together through a frame device.

Although these prior filtration media constructions have been found useful, further improvements are desirable to provide filtration media having increased durability and filtration efficiency for fine particle removal from flowing gas streams.

SUMMARY OF INVENTION

This invention provides an enhanced filtration media composite for removing particles from flowing gas streams. The composites include a first media layer in the form of an electret fibers (electrostatic composition) that is formed of about 50 wt. % of polypropylene fibers and 50 wt. % of modacrylic fibers such as is disclosed in U.S. Pat. No. 4,798,850 and available commercially. The second media layer is formed of non-woven polyester fibers, and may include 80 wt. % of 3 denier×3 inch long polyester staple and 20 wt. % 1.4 denier×1½ inch long polyester staple. By combining small increments of the first electret media layer with the second non-woven media so as to provide a composite needled structure, significant improvements and performance gains result. Such filtration media composite construction of the first and second media layers have not been previously formulated to produce the enhanced advantages, such as improved filtration efficiency and better dust holding capacities.

In formulating the composite media product, the second media layer (polyester staple) is applied or directed to the first media layer through a carding procedure by an apparatus which combs and orients such media prior to it being needle punched uniformly to the second media, resulting in each of these two media layers being uniformly intertwined with each other so as to form a single composite structure. If desired, the bulk density of the resultant composite structure can be varied during the needling operation.

Although each of the individual media layers are generally known, the combination of these two media layers being uniformly needled together provides an unobvious synergistic effect and results in enhanced mechanical and physical properties not heretofore possible with non-woven air filtration media. According to this invention, the fibers of either media layer can be beneficially needled into the other layers. However, it is preferred that fibers of the first electret media layer are uniformly needled into the second non-woven fibrous layer to a selected needling depth and spacing.

Accordingly, this invention advantageously provides enhanced filtration media composites for filtering flowing gas streams, and method for making the composites in which a first electret layer is uniformly joined to a second non-woven layer by utilizing a selective needling configuration and procedures. The resulting filter composite provides increased gas flow pressure drop and particle removal efficiency, and longer useful filter life.

BRIEF DESCRIPTION OF DRAWINGS

This invention will be described further with reference to the following drawings, in which.

DESCRIPTION OF INVENTION

Figure 1:
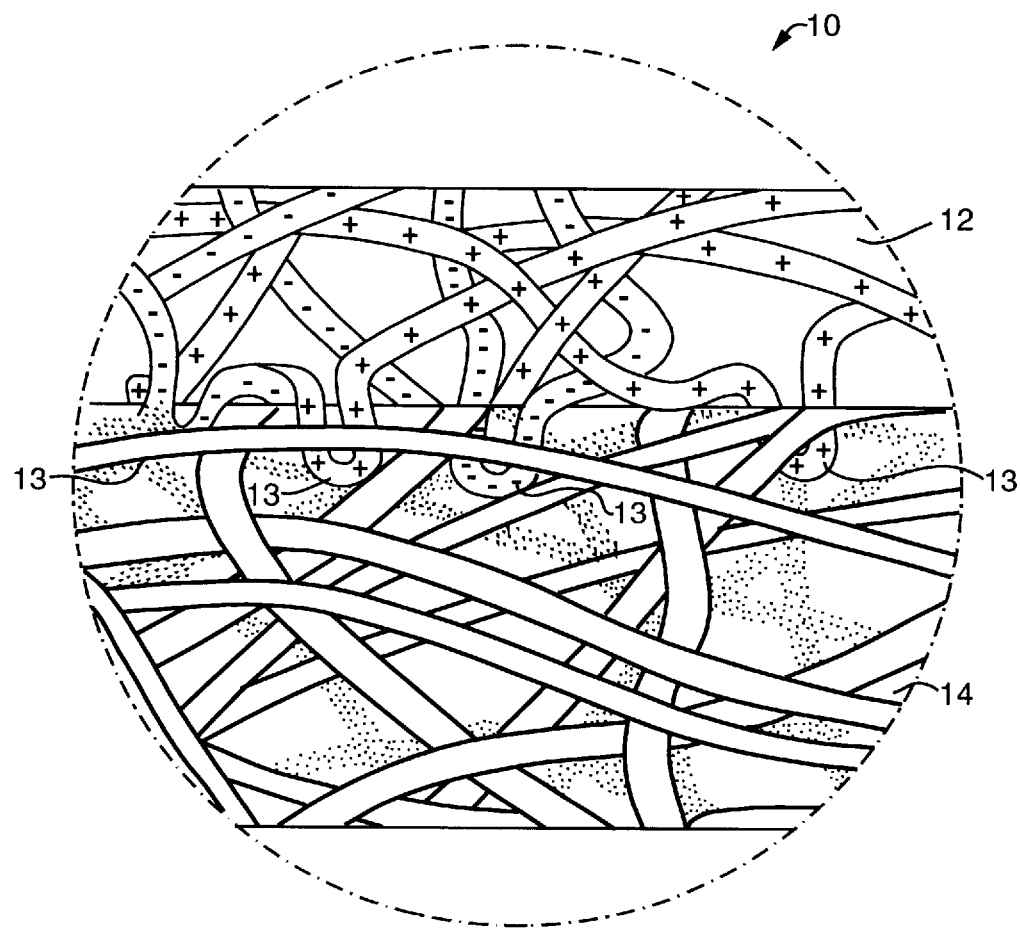
FIG. 1 is an enlarged cross-sectional sketch showing the layered filter media composite constructed by selective needling according to this invention.

As generally shown by FIG. 1, a layered composite filter media 10 is characterized by a first electret fibrous layer 12 being uniformly attached by being needled at 13 onto a second non-woven fibrous layer 14. This idealized cross-sectional sketch of the layered media composite 10, has the electret layer 12 depicted with an equal number of positively and negatively charged fibers. The mechanical layer 14 is depicted by non-charged fibers in the lower layer. These two layers are uniformly interconnected together by some of the fibers 13 from the electret layer 12 being uniformly needle punched to selected layer depths into the layer 14.

For this invention, the term electret used for the first media layer 12 describes a fibrous gas filtration media in which individual fibers carry an electrostatic charge, while the media, as a whole has essentially a neutral charges. Such electret fibers may behave like a mini capacitor, with one side of the fiber having a negative charge and other side having a positive charge. The addition of an electrostatic charge to the fibers results in increased particle retention and removal efficiency, while the gas flow pressure drop through the media remains essentially unchanged. The increase in filtration efficiency is primarily attributed to the charged fibers attracting particles having an opposite charge, and the attraction of neutral particles when a dipole is induced by the charges on the fibers. The first electret media layer is generally described in U.S. Pat. No. 4,798,850, which is incorporated herein by reference to the extent needed to adequately disclose the present invention. The second media layer 14 is made from staple polyester fibers having two different denier sizes and lengths.

Figure 2:
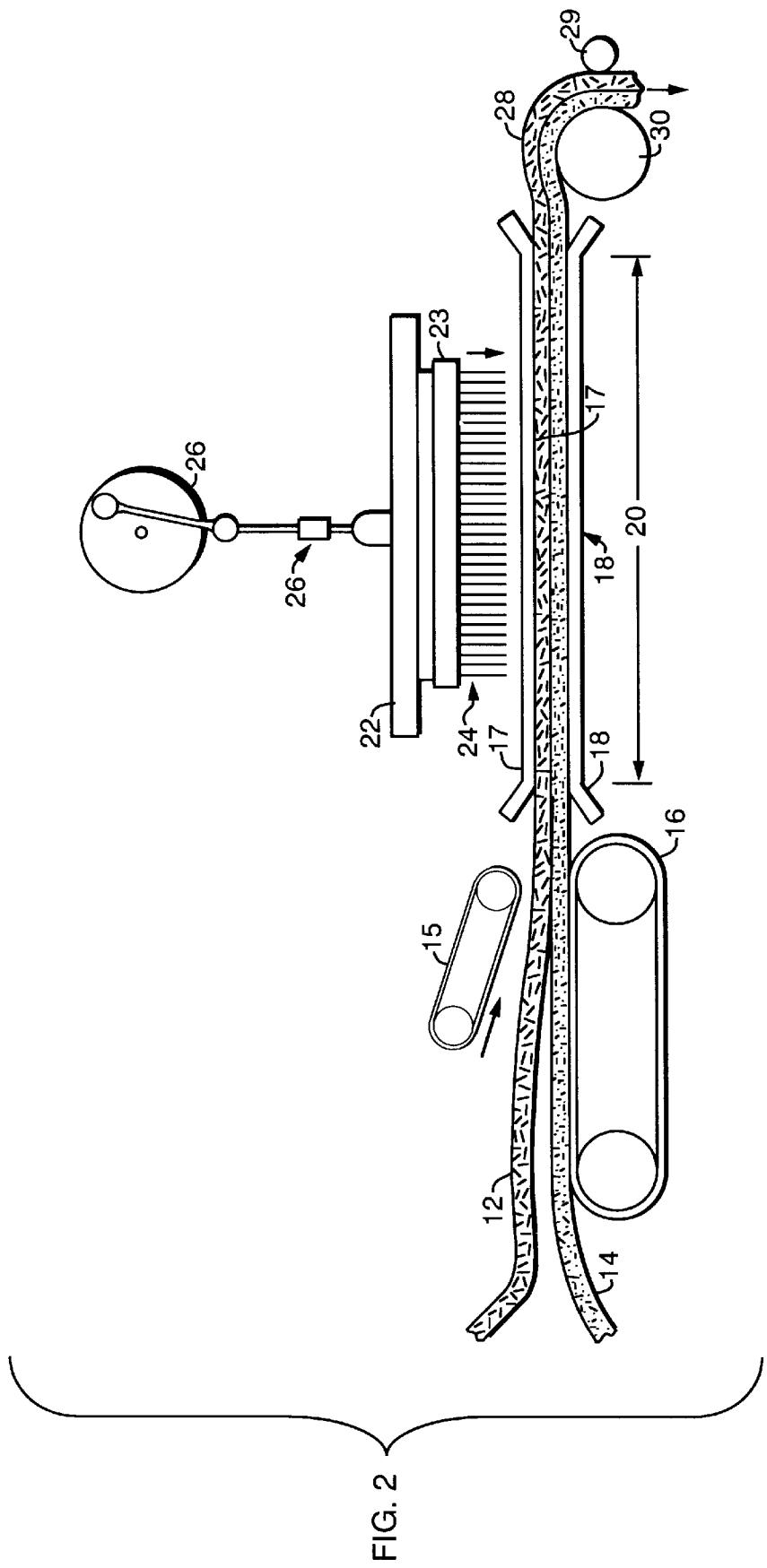
FIG. 2 is a schematic cross-sectional drawing generally showing the needling apparatus and method for manufacture of the filter media composites of this invention.

In the filter media composite manufacturing method, as generally shown by FIG. 2, the fibers are carded, needlepunched on one side using barbed needles that intertwine the fibers with those of the adjacent layer, thereby creating a uniform mechanically bonded composite which has a tortuous gas flow path for particle capture in the composite media 10.

The needle bonding apparatus and method for manufacture of the filter media composite 10 as generally shown by FIG. 2, has the upper fiber web 12 formed of electret and the lower polyester fiber web 14 are both advanced to the needle zone 20. The webs 12 and 14 are both pushed and pressed into position through draw-in rollers and belt units 15 and 16, such that both webs are moved into the needle zone 20. The needling zone 20 includes an upper hole plate 17 and a lower hole plate 18 and it is at this location where the media needling media operation occurs. A needle beam 20 holds a needle board 23 containing multiple needles 24 equally spaced apart. The needle beam is driven by a rotary drive mechanism 26 which causes the plurality of needles 24 affixed to the needle beam 22 through needle board 23 to act on the respective layers and 12 and 14 of media which are properly positioned during needling through lower and upper hole plates 17, 18.

After the needling step in needle zone 20 is completed to produce media composite 28, the drawing-off rollers 29 and 30 pull the compressed media composite 28 out as a finished product.

The method necessary for manufacturing the composite filter products according to this invention include the following basic steps:

1. Blending the fibers, e.g. 80%–20% polyester fibers together to provide desired weight per unit area of media.
2. Carding, in which the blending step No. 1 is advanced to where the staple is opened, cleaned, aligned and formed into a continuous web of entwined strands of fibrous material.
3. Cross-lapping in which adjacent multiple layers of web fibers are deposited one with respect to another.
4. Needling, by which procedure loose fibers are converted into a coherent non-woven fabric on a needle loom by punching fibers from one layer to interconnect with fibers of the adjacent layer, e.g. electret fiber into the polyester substrate and withdrawing the needles, thereby leaving the media fibers entangled so as to form a unitary composite structure. This needling step is accomplished by utilizing a needle density or spacing of 100–200/in$^2$, a needle penetration from one layer into the adjacent layer of 0.05–1.0 inch depending on layer thickness. The needling penetrations from the first media layer into the second media layer should be at least 20% and need not exceed about 60% of the second layer thickness and is preferably about 30–50% penetration. A useful needling rate is 300–1500 repetitions/minute.

For the needling method as generally shown by FIG. 2, and used to bond the electret media 12 to the lower polyester media 14; the needles preferably are driven to a depth of 0.062 to 0.8 inch with the needling density of 120–180 penetrations/inch at a speed of 500 to 1200 revolutions/minute. The two media layers are bonded into one composite 10 by action of the many barbed needles 24 which entangles the fiber of the electret media with the fibers of the polyester media.

The upper electret layer 12 has a thickness range from 0.010 to 0.75 inch and the lower polyester layer has a thickness range of 0.010 to 0.75 inch. The resulting needled composite media will have a thickness range of 0.020 to 0.75 inch.

Although some non-woven fiber needling procedures utilizing needling looms are generally known in this art, the advantages of providing interneedled composites has not been previously realized. For example, it was found that an electret 70 needle punch media composite has about three times the dust holding capability compared to the polyester needled media alone. The resultant composite product provides greater economic benefits, i.e. less process down time and longer filter life.

These resulting composite media filters are strong, resist abrasion, and can remove large quantities of particulate from flowing gas streams with minimal pressure drop across the filter. They can be fabricated using a wide variety of fiber materials and surface finishes, which permit their use in high temperature and/or corrosive environments. Surface treatments allow particulates to build up on the surface of the filter media and form a cake, which can be released by back pulsing the filter with a blast of air which regenerates the filter.

Because many variables exist in the composite media fabrication process, e.g. fiber type, diameter, and surface treatment needling depth and machine speed, etc., that mass customization of filter composites is possible. Thus, it is feasible to have tailor-made filters media composites made to match a particular operating environment and optimize flow and particle retention in the filter.

Adding electret media to needlepunch media to provide needlepunch/electret composites is preferable for several reasons. First, the electrets media can hold greater quantities of particulates at a given pressure drop than filters that rely primarily on mechanical means for particle removal. This has been attributed to the way the particles load more evenly over the entire surface of the fibers, leaving more space between fibers for gas flow. Further, one of the mechanisms of electrostatic particle removal is the polarization of particles as they approach the charged fibers. The induced dipole is capable of polarizing sites on the downstream needlepunch fibers which in turn attract and retain particles. This assumes that the electret layer is located upstream of the needlepunch media.

For some composite filter installations, it may be preferred to have the first electret layer 12 located downstream of the second needlepunch media 14. For instance, the surface finish on the needlepunch second layer 14 may be utilized for cake buildup and release and, in this case, it would be facing the gas flow stream In the beginning of the particulate filtration process and prior to cake formation, particle removal efficiency can be very low and require days before the removal efficiency increases to an acceptable level. Incorporating a layer of electret media on the downstream side can reduce the duration of this filter break-in period, or even eliminate it.

In the needling manufacturing operation necessary for making the composite, the first electret layer 12 is preferably filtration needled into the second polyester layer or substrate 14. It is important to control the needle spacing and depth of needle penetration as well as the needle stroke rate into the polyester substrate within the specified ranges during the needling operation. By such control, it is possible to provide desired density of the media composite end product which contributes to the improved characteristics provided by the product.

During the formation of the mediate composite, it is necessary that first the two polyester staple fibers be needled, namely, the 80 wt. % polyester staple being needled with the 20 wt. % polyester staple to form a polyester substrate. Next, both the 50 wt. % polypropylene and 50 wt. % modacrylic electrets are both simultaneously needled into the polyester substrate During this later operation, the depth of needle penetration by the needles with electret penetrating into the polyester second layer substrate is carefully controlled. A range of penetration is 0.62 to 1.0 inch (as measured from the top sur ace of the polyester substrate) has been found to be useful and beneficial. Control of needle penetration permits minimized disturbance of the polyester media second layer and produces a composite end product which assures optimum air permeability and thickness, as well as other desirable physical and mechanical properties. Enhanced composite properties such as particle removal, pressure drop, and permeability are achieved by control of a needle stroke range of between 500–1200 repetitions per minute.

This invention will now be illustrated by the following examples, which should not be regarded as being limiting in scope.

EXAMPLE 1

Several experiments were performed in order to verify the advantages and improvements provided by the media composites of this invention. The following media samples were constructed and tested for particle removal.

| (a) | NP | 400 g/m² polyester needlepunch media material* composed of 80 wt. % 3 denier × 3 inch polyester stapled and 20 wt. % 1.4 denier by 1.5 inch polyester staple. |
| --- | --- | --- |
| (b) | 30 | 30 g/m² electret media** composed of 50 wt. % 2.8 decitex × 50 mm polypropylene staple and 50 wt. % 3.3 decitex × 51 mm monocrylic staple. |
| (c) | 30/NP | 30 g/m² electret over needlepunch material (a). |
| (d) | 70 | 70 g/m² electret media composed of same 50:50 composition of polypropylene and monocrylic fibers as (b), and 400 gram basis weight polyester substrate compared of same composition as (a). |
| (e) | 70/NP | 70 g/m² electret over needlepunch material (a). |

*Commercially available non-woven fabric designated as AIRSTAR ™ from AFFCO, Inc , Newburgh, New York.
**Commercially available as electret fabric designated as FLO CLEAN ™ from AFFCO, Inc., Newburgh, New York.

Feed Particles

Feed particles loading utilized neutralized PTI Fine (International Standards Organization fine sized particles) with a mass concentration of 200 mg/m³

Efficiency testing utilized neutralized polydispersed potassium chloride (KCL)

Loading Velocity

The filter media designed a, c and e were tested for particle loading at a media face velocity of 15 cm/s. The terminal pressure drop across the filter was 22–23 mm water gauge. An absolute filter was placed downstream from the test media to capture any particles passing through the test media.

Particle Removal Efficiency

Filter media designated a, b, c, d, and e were tested for particle removal efficiency by particle size at a media face gas velocity of 15 cm/s. Their pressure air flow rates of drops were determined at 5, 10, 15, 20, 25 and 30 m³/s. The effective filtration area of the tested media was 2 ft².

Gravimetric efficiency (GE) for the test filter media was calculated as follows:

$$GE(\%) = \frac{\text{weight of test sample}}{\text{weight increase of test sample} + \text{weight increase of the absolute filter}}$$

Advantages of the media composite based on comparative testing of specimens (b) and (e) measured in terms of reduced pressure drop and increased dust holding capability and filtration efficiency. Efficiency is measured by particle removal for various particle sizes.

Figure 3:
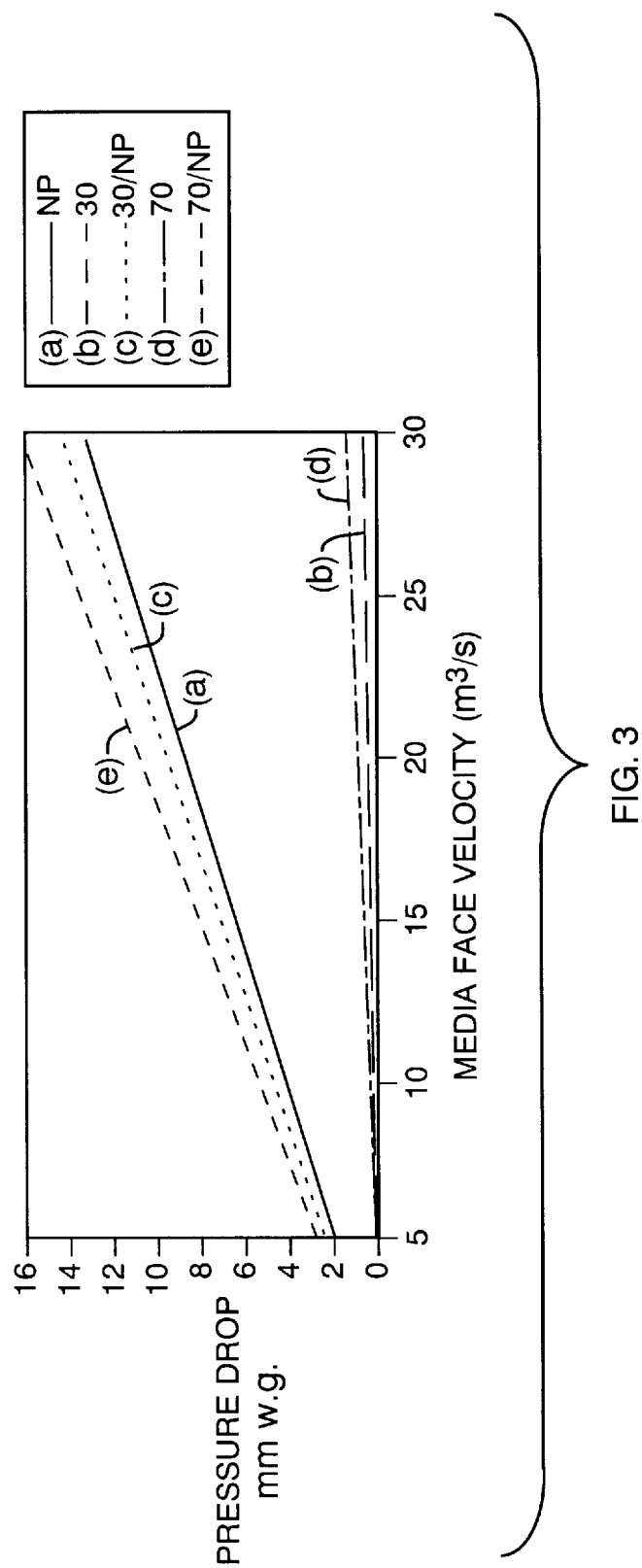
FIG. 3 is a graph showing filter composite pressure differential (millimeter of water gauge) plotted vs. gas flow velocity at the media face (cm/sec.) for various filter media and composites.
Figure 4:
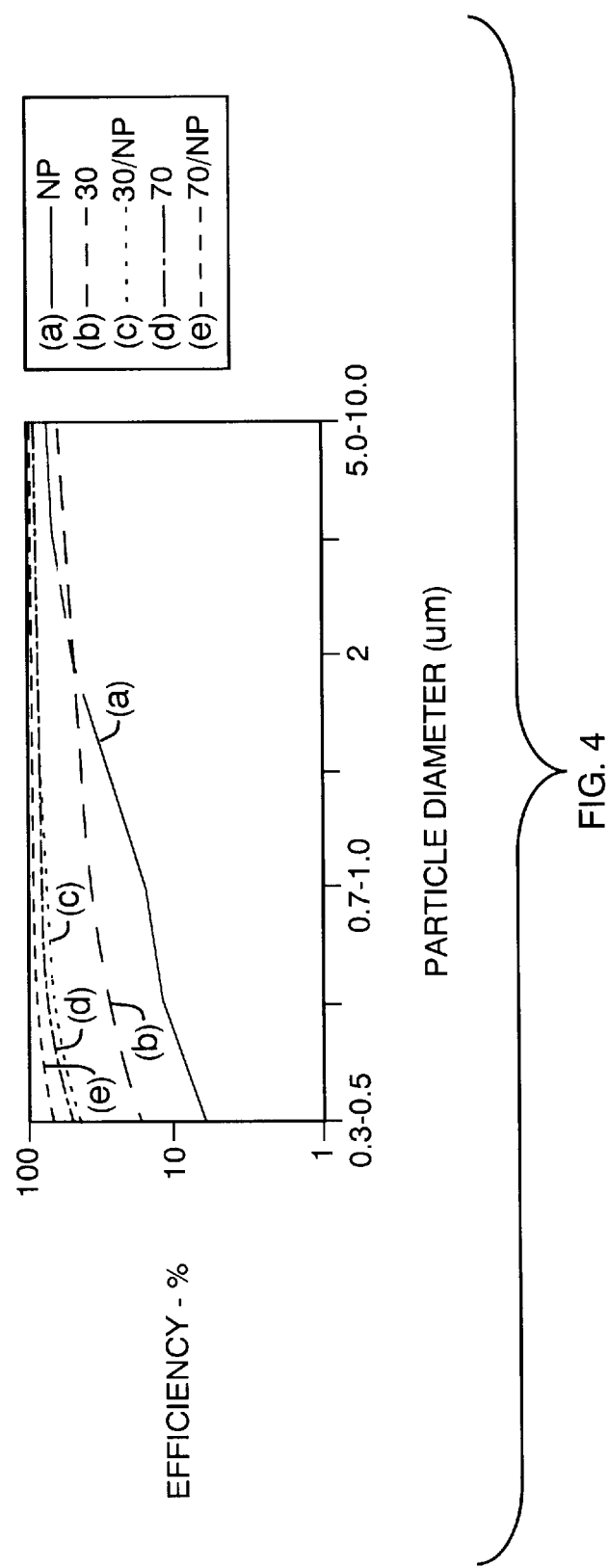
FIG. 4 is a graph showing filter particle removal efficiency percentages plotted vs. particle size (in microns) for various filter media and composites.
Figure 5:
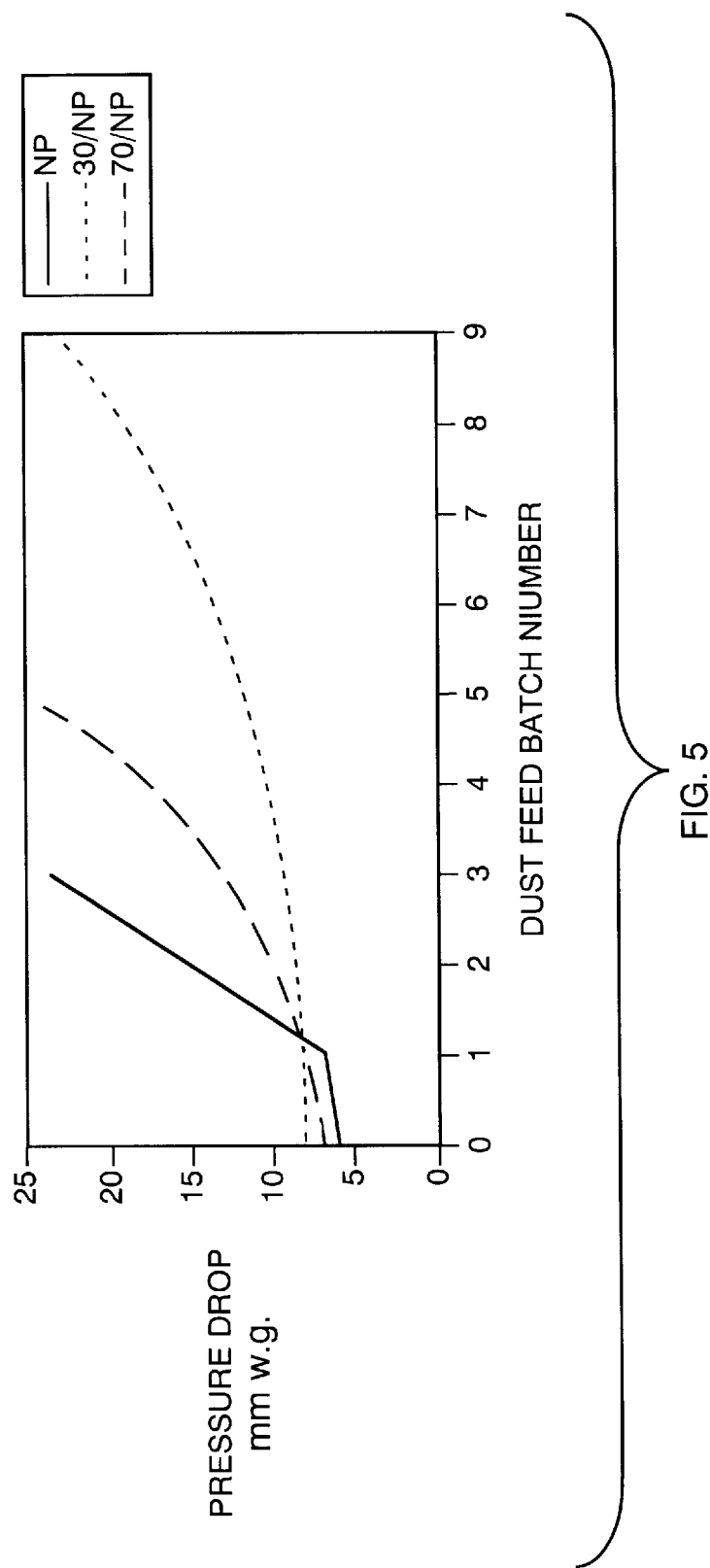
FIG. 5 is a graph showing gas flow pressure drop plotted vs. dust feed batch number for various filter media composites.

The results of these tests of the experimental filtration media are shown in Tables 1, 2, 3 and 4, and are depicted graphically by FIGS. 3, 4 and 5.

TABLE 1

Gas Flow Pressure Drop (mm w.g.) vs. Face Velocity

| Media Sample | Test Media | Face Velocity (cm/s) | | | | | |
| --- | --- | --- | --- | --- | --- | --- | --- |
| | | 5 | 10 | 15 | 20 | 25 | 30 |
| a) | NP | 2.2 | 4.2 | 6.3 | 8.5 | 10.6 | 12.8 |
| b) | 30 | 0.07 | 0.14 | 0.21 | 0.29 | 0.37 | 0.46 |
| c) | 30/NP | 2.4 | 4.7 | 6.9 | 9.2 | 11.5 | 13.8 |
| d) | 70 | 0.1 | 0.3 | 0.5 | 0.7 | 0.9 | 1.1 |
| e) | 70/NP | 2.7 | 5.1 | 7.7 | 10.3 | 12.9 | 15.5 |

As shown in Table 1 and by FIG. 3, the gas flow pressure drops of the composite filter media at increasing face velocity were approximately 10% greater than for the sum of the individual component layers at the same face velocity. This increased pressure drop was caused by the additional interconnecting needling used to combine the two component layer into a composite filter structure.

TABLE 2

| | | Particle Removal Efficiency (%) @ 15 cm/s using KCl Aerosol Loading | | | | | | |
|---|---|---|---|---|---|---|---|---|
| Media | Test | Particle Diameter (μm) | | | | | | |
| Sample | Media | 0.3–0.5 | 0.5–0.7 | 0.7–1.0 | 1.0–2.0 | 2.0–3.0 | 3.0–5.0 | 5.0–10.0 |
| a) | NP | 8.31 | 15.02 | 18.71 | 32.84 | 55.19 | 72.10 | 76.23 |
| b) | 30 | 23.85 | 31.49 | 37.65 | 43.02 | 50.87 | 56.84 | 59.69 |
| c) | 30/NP | 51.22 | 64.10 | 70.54 | 79.97 | 88.16 | 93.94 | 94.27 |
| d) | 70 | 56.92 | 69.60 | 77.01 | 83.01 | 87.36 | 90.24 | 91.25 |
| e) | 70/NP | 73.59 | 84.89 | 89.68 | 93.56 | 96.57 | 97.79 | 98.02 |

As shown in Table 2 and by FIG. 4 composite filter structures produced according to this invention exhibit much better particle removal efficiencies than for the sum of the individual component layers, particularly for the smaller size particles being filtered. This improvement indicates that the mechanisms of particle removal operating in the media composites are synergistic in effect and unobvious, and substantially exceed what would be expected from merely observing the filtration performance of the individual component layers.

The sample testing established conclusively that the composite (c) produced unexpected it substantially in excess of what would normally be expected when combining (a) and (b), and established improved results by a magnitude of twice to what would normally be expected from the combined filter composites.

The filter media composite testing was conducted under controlled conditions with dust particle sizes in range of 0.3 to 0.5 microns and 0.7 to 1.0 microns. The dust particles were introduced using a potassium chloride KCl aerosol flowing at 15 cm/sec through 2 ft.² of composite media formed of needle punched media and composite 30 gram electret and 400 gram polyester and their composite (samples a, b and c) at ambient temperature. Particle removal efficiency refers to measurement of upstream particle flow vs. downstream particle flow.

The testing as reported followed the ASHRAE (Am. Soc. Heating Refrigerating Air Conditioning Engineering) Standard 52.5P, April 1996 entitled "Method of Testing General Ventilation Air Cleaning Devices for Removal Efficiency by Particle Size". However, with regard to load testing (load capacity is the amount of dust a filter media can hold) the I.S.O. (International Organization for Standardization) fine dust standard was used.

TABLE 4

| Filter Media Gravimetric Efficiency - % | | | |
|---|---|---|---|
| | NP | 30/NP | 70/NP |
| Test media weight gain (gm) | 9.5 | 14.3 | 24.6 |
| Absolute filter weight gain (gm) | 1.4 | 0.3 | 0.3 |
| Average lifetime gravimetric efficiency (%) | 87.16 | 97.95 | 98.80 |

The loading results shown in Table 3 and 4 and by FIG. 5, showing gas flow pressure drop vs. particle loading demonstrate to a greater degree this synergistic phenomenon for filter media composites. The final weight increase for the 70 gm/m² needle punched composite (70/NP) was greater than 2.5 times that of the needlepunched (NP) layer alone, but its initial ΔP was only 1.6 mm of water gauge higher.

It is believed that the new filter media composites provide improved performance because they provide an increased tortuous path for particle capture. In other words, the flow of air or other gases the media compose is interrupted and diverted from a straight path by the random orientation of media fibers due to the needling method and composite construction, and results in substantial particle capture and retention in the filter composition.

It is expected that the filter media composites of this invention, should be useful in industrial dust collection installations, including pulse-jet bag houses, equipment protection, and at the point-of-emission in the workplace. Also, lower bass weight components should emend their use to other applications, including: HVAC, room air purifiers, cabin air filters, and vacuum cleaner filters.

Although this invention has been disclosed broadly and is described in terms of preferred embodiments, it will be

TABLE 3

| | Gas Flow Pressure Drop (mm w.g.) vs. Dust Loading | | | | | | | | |
|---|---|---|---|---|---|---|---|---|---|
| Test | Dust Feed Batch Number | | | | | | | | |
| Media | 0 | 1 | 2 | 3 | 4 | 5 | 6 | 7 | 8 | 9 |
| NP | 6.2 | 6.9 | 14.2 | 23.0 | | | | | | |
| 30/NP | 7.0 | 8.2 | 9.9 | 13.0 | 17.4 | 22.9 | | | | |
| 70/NP | 7.8 | 8.0 | 8.3 | 9.0 | 10.0 | 11.5 | 13.6 | 16.0 | 18.7 | 22.1 | understood that modifications and variations can be made all within the scope as defined by the following claims:

We claim:

1. A filter media composite adapted for removing particulates from flowing gas streams, the composite comprising:
   a first media layer including about 50 wt % polypropylene fibers and about 50 wt % modacrylic fibers; and having an electret composition;
   a second media layer composed of non-woven polyester fibers and formulated of about 80 wt % 3 denier×3 inch polyester staple and 20 wt % 1.4 denier×1.5 inch polyester staple, said second media layer being attached substantially uniformly onto said first media layer by fibers of one said layer being needled uniformly into the fibers of the other adjacent said layer, to produce a composite whereby the filtering media composite provides enhanced mechanical strength and increased retention of particles in the composite media.

2. The filter media composite of claim 1, wherein fibers of said first electret media layer are needled uniformly into said second non-woven media layer to provide a composite needled filtration media.

3. The filter media composite of claim 1, wherein said first media layer is composed of about 50 wt. % 2.8 decitex×50 mm polypropylene staple fibers and about 50 wt. % 3.3 decitex×51 mm modacrylic staple fibers.

4. The filter media composite of claim 1, wherein the first media layer bulk density is 400 gm/m$^2$, and the second media layer ball density is 70 gm/m$^2$.

5. The filter media composite of claim 1, wherein the needling density utilized for fibers between the first and second media layers is 100–200/in$^2$.

6. The filter media composite of claim 1, wherein the needling penetration of fibers from said first layer into the second layer is 20–80% of the second layer thickness.

7. A filter media composite adapted for removing fine particles from flowing gas streams, the composite comprising:
   a first media layer having a bulk density of 400 gm/m$^2$ and including about 50 wt % polypropylene fibers and about 50 wt % modacrylic fibers; and having an electret composition;
   a second media layer having a bulk density of 70 gm/m$^2$ and composed of non-woven polyester fibers and formulated of about 80 wt % 3 denier×3 inch polyester staple and 20 wt % 1.4 denier×1.5 inch polyester staple, said first media layer being attached substantially uniformly onto said second media layer by fibers of said first layer being needled uniformly into the fibers of adjacent said second layer by fibers from the first layer penetrating into the second layer by 20–80% of the second layer thickness at a uniform spacing of 100–200 per in$^2$, whereby the filtering media composite provides enhanced mechanical strength and increased retention of particles in the composite media.

8. A method for making a filtration media composite comprising the steps of:
   (a) positioning a first electret media layer which electret media is a blend of (i) polyolefin fibers and (ii) fibers of an addition polymer comprising one or more halogen substituted hydrocarbons adjacent to a second non-woven media layer said second non-woven comprised of non-woven fibers of two different denier sizes and lengths; and
   (b) needling fibers from one of said layers into the other of said layer so that fibers of said first electret media layer penetrate into said second non-woven media layer by 20–80% of said second layer thickness.

9. The method of claim 8, wherein the needling speed is 300–1500 repetitions per minute.

10. The method of claim 8, wherein fibers from said first electret layer are needled into said second non-woven fibrous layer.

11. The method of claim 8 wherein said needling of fibers provides substantially uniform needling of one of said layers into the other of said layers.

12. The method of claim 8 wherein said needling of fibers is carried out at a needle spacing of about 100–200 needles per square inch.

13. A filter media composite adapted for removing particulates from flowing gas streams comprising a first electret media layer which electret media is a blend of (i) polyolefin fibers and (ii) fibers of an addition polymer comprising one or more halogen substituted hydrocarbons and a second non-woven and non-charged fibrous layer comprising fibers of two different denier sizes and lengths wherein said first media layer is needle punched into said second layer to form said filter media composite.

14. The filter media of claim 13, wherein said first media layer is needled punched into said second layer to a thickness of about 20–80% of said second layer thickness.

15. The filter media of claim 13, wherein said first media layer is needled punched into said second layer by a needling density of about 100–200/in$^2$.

16. The filter media of claim 13 wherein said first media layer is substantially uniformly needled punched into said second layer.

* * * * *